United States Patent
Ma et al.

(10) Patent No.: US 10,555,579 B2
(45) Date of Patent: Feb. 11, 2020

(54) PLASTIC COMPOSITION, MIDSOLE MADE FROM THE SAME AND METHOD OF MAKING

(71) Applicant: I-TECH. SPORTING ENTERPRISE LTD., Changhua County (TW)

(72) Inventors: Chih-Hung Ma, Changhua County (TW); Huang-Chieh Wu, Changhua County (TW); Yi-Kai Chen, Changhua County (TW); Ming-Ju Yen, Changhua County (TW); Chih-Hao Tseng, Changhua County (TW); Chia-Hao Chang, Changhua County (TW)

(73) Assignee: I-Tech. Sporting Enterprise Ltd., Changhua County (TW)

( * ) Notice: Subject to any disclaimer, the term of this patent is extended or adjusted under 35 U.S.C. 154(b) by 29 days.

(21) Appl. No.: 15/989,325

(22) Filed: May 25, 2018

(65) Prior Publication Data

US 2019/0098959 A1 Apr. 4, 2019

(30) Foreign Application Priority Data

Sep. 30, 2017 (TW) .............................. 106133876 A

(51) Int. Cl.
| | | |
|---|---|---|
| *C08L 23/08* | (2006.01) | |
| *A43B 13/18* | (2006.01) | |
| *B29D 35/12* | (2010.01) | |
| *A43B 13/04* | (2006.01) | |
| *B29K 23/00* | (2006.01) | |

(52) U.S. Cl.
CPC ............ *A43B 13/187* (2013.01); *A43B 13/04* (2013.01); *B29D 35/122* (2013.01); *C08L 23/0853* (2013.01); *B29K 2023/083* (2013.01); *C08L 2205/025* (2013.01); *C08L 2205/03* (2013.01); *C08L 2205/035* (2013.01); *C08L 2207/066* (2013.01); *C08L 2312/00* (2013.01)

(58) Field of Classification Search
CPC ...... C08L 23/0853; C08L 23/08; C08L 23/10; C08L 2205/03; C08L 2205/035; C08L 2312/00; C08L 2205/025; C08L 2207/066; C08K 2023/083; A43B 13/187; A43B 13/04; A29D 35/122

See application file for complete search history.

(56) References Cited

U.S. PATENT DOCUMENTS 6,720,364 B2 * 4/2004 Sueda et al. ........... C08K 5/098
521/134

FOREIGN PATENT DOCUMENTS

| CN | 1369520 A | 9/2002 |
|---|---|---|
| CN | 103189429 A | 7/2013 |
| CN | 105367891 A | 3/2016 |
| CN | 105566730 A | 5/2016 |

OTHER PUBLICATIONS

Search Report and Written Opinion issued to Singapore counterpart application No. 10201800823S by the IPOS dated Jul. 23, 2018 (12 pages).
Search Report appended to an Office Action, which was issued to Chinese counterpart application No. 201710938388.3 by the CNIPA dated Jul. 1, 2019 (4 pages, English translation included).
Search Report appended to an Office Action, which was issued to Taiwanese counterpart application No. 106133876 by the TIPO dated Sep. 7, 2018 (2 pages, English translation included).

* cited by examiner

*Primary Examiner* — Nathan M Nutter
(74) *Attorney, Agent, or Firm* — Michael Best & Friedrich LLP

(57) ABSTRACT

A plastic composition includes a polymer component. The polymer component includes an ethylene-vinyl (EVA) copolymer, a first ethylene-α-olefin copolymer having a hardness ranging from 55 Shore A to 60 Shore A measured according to ASTM D2240, a second ethylene-α-olefin copolymer having a hardness ranging from 85 Shore A to 90 Shore A measured according to ASTM D2240, and polypropylene (PP). The plastic product made from the composition has a loss factor ratio of tan $\delta(-20°$ C.) to tan $\delta(40°$ C.) at a frequency of 10 Hz, which ranges from 2.5 to 3.8. A midsole and a method of producing the midsole are also disclosed.

16 Claims, No Drawings

PLASTIC COMPOSITION, MIDSOLE MADE FROM THE SAME AND METHOD OF MAKING

CROSS-REFERENCE TO RELATED APPLICATION

This application claims priority of Taiwanese Invention Patent Application No. 106133876, filed on Sep. 30, 2017.

FIELD

The disclosure relates to a plastic composition for producing a plastic product, and more particularly to a plastic composition which includes ethylene-vinyl acetate and which is suitable for making a midsole having a relatively low shrinkage, and a method of making the midsole.

BACKGROUND

Midsoles of sports shoes generally require a few important properties, such as good resilience, appropriate softness and lightweight, apart from having a certain level of hardness.

In order to obtain the aforementioned properties, midsoles for shoes are usually made from a foamable plastic composition including ethylene vinyl acetate (EVA). By foaming the foamable plastic composition including EVA, midsoles can achieve a certain level of hardness while possessing good resilience, appropriate softness and lightweight. Although conventional plastic compositions including EVA provide midsoles having appropriate softness and good resilience not less than 55%, the shrinkage rate thereof is undesirably greater than 1.5%, and is unable to satisfy the industrial standards of footwear manufacturing. From the conventional plastic compositions, it is hard to produce midsoles having a high dimensional accuracy. U.S. Pat. No. 8,461,222 B2 discloses a method of making a foamable material for producing midsoles, which is made from a composition including thermoplastic polyolefins. However, the resilience of the midsoles produced therefrom is lower than 55% and cannot meet the high-resilience requirement for midsoles of sport shoes.

Furthermore, the compositions in the prior art encounter another problem. When different midsoles having varying properties, such as varying resilience and shrinkage rate, are to be produced, it is necessary to select different compositions and different foaming ratios according to the requirements of the midsoles. Even if midsoles are produced from the same composition, it remains necessary to have different foaming ratios. Therefore, the cost of manufacturing midsoles will increase since different forming molds are needed for different foaming ratios.

SUMMARY

Therefore, an object of the disclosure is to provide a plastic composition that can alleviate at least one of the drawbacks of the prior art.

According to one aspect of the disclosure, a plastic composition for producing a plastic product includes a polymer component.

The polymer component includes an ethylene-vinyl (EVA) copolymer, a first ethylene-α-olefin copolymer having a hardness ranging from 55 Shore A to 60 Shore A measured according to ASTM D2240, a second ethylene-α-olefin copolymer having a hardness ranging from 85 Shore A to 90 Shore A measured according to ASTM D2240, and polypropylene (PP).

The plastic product made from the plastic composition has a loss factor ratio of tan δ(−20° C.) to tan δ(40° C.) at a frequency of 10 Hz, measured according to JIS k 7244-4, ranging from 2.5 to 3.8.

According to another aspect of the disclosure, a midsole is made from the aforementioned plastic composition. The midsole has a resilience not lower than 55% measured according to ASTM D2632, and a shrinkage rate not greater than 1.5% measured according to SATRA TM-70.

According to still another aspect of the disclosure, a method of making midsoles includes: preparing different formulations from the plastic composition; foaming each of the formulations in a primary forming mold to form a foamed midsole blank; and forming the foamed midsole blank in a secondary forming mold to produce a final midsole. In particular, the different formulations are foamed by using the same primary forming mold that provides the same foaming ratio, and the final midsoles produced from the different formulations of the plastic composition have different resilience and shrinkage properties.

DETAILED DESCRIPTION

The EVA copolymer is well known in the art and may include a vinyl acetate monomer (VAM) having an amount ranging from 24% to 29% based on 100% of the EVA copolymer. The melt flow index (MI) of the EVA copolymer may range from 0.9 g/10 min to 9 g/10 min measured at a measurement temperature of 190° C. under a load of 2.16 kg according to ASTM D 1238. Examples of commercially available EVA copolymers are shown in Table 1.

TABLE 1

| Manufacturers | Type | Amount of VAM (%) | MI (g/10 min) |
|---|---|---|---|
| Formosa Plastics Corporation | 7470 M | 26 | 6 |
| USI Corporation | UE-659 | 25 | 2 |
| E. I. Du Pont de Nemours and Company | 260 | 28 | 6 |
|  | 265 | 28 | 3 |
|  | 360 | 25 | 2 |
| ExxonMobil Chemical Company | FL 00328 | 27 | 3 |
|  | FL 00728CC | 27.5 | 7 |
| Du Pont- Mitsui Polychemicals Co., Ltd. | EV 270 | 28 | 1 |
|  | EV 260 | 28 | 6 |
| Arkema S.A. | 28-05 | 27~29 | 5~8 |
|  | 28-03 | 26~28 | 3~4.5 |
| Sumitomo Chemical Co., Ltd. | K3010 | 28 | 7 |
|  | K2010 | 25 | 3 |
| Hanwha Chemical Corporation | 1828 | 28 | 4 |
|  | 1826 | 26 | 4.5 |

A weight ratio of the first ethylene-α-olefin copolymer to the second ethylene-α-olefin copolymer ranges from 0.3 to 1. More specifically, the weight ratio of the first ethylene-α-olefin copolymer to the second ethylene-α-olefin copolymer ranges from 0.4 to 0.8.

At a measurement temperature of 190° C. and under a load of 2.16 kg according to ASTM D 1238, the first ethylene-α-olefin copolymer, which has a hardness ranging from 55 Shore A to 60 Shore A, has a melt flow index (MI) ranging from 0.4 g/10 min to 0.6 g/10 min. The second ethylene-α-olefin copolymer, which has a hardness ranging from 85 Shore A to 90 Shore A, has a MI ranging from 1.1 g/10 min to 1.3 g/10 min. The first ethylene-α-olefin copolymer and the second ethylene-α-olefin copolymer have properties as shown in Table 2.

TABLE 2

| Property | Test Method | Unit | First ethylene-α-olefin copolymer | Second ethylene-α-olefin copolymer |
|---|---|---|---|---|
| MI (190° C.) | ASTM D1238 | g/10 min | 0.4~0.6 | 1.1~1.3 |
| Density | ASTM D1505 | kg/m$^3$ | 861~863 | 884~886 |
| Tensile strength at break | JIS K7113 | MPa | >5 | >27 |
| Tensile elongation at break | | % | 799~801 | 799~801 |
| Torsional Stiffness 23° C. | ASTM D1043 | MPa | 1~3 | 8~10 |
| <−30° C. | | MPa | 6~8 | 32~34 |
| Vicat softening point | ASTM D1525 | ° C. | — | 57~59 |
| Melting point | DSCMETHOD | ° C. | 49~51 | 65~67 |
| Brittle Temperature | ASTM D746 | ° C. | <−70 | <−70 |

The polypropylene (PP) of the polymer component has a MI ranging from 14 g/10 min to 16 g/10 min.

Based on 100% of the polymer component, the EVA copolymer has an amount of 31 wt % to 56 wt %, the first and second ethylene-α-olefin copolymers has a total amount of 28 wt % to 54 wt %, and PP has an amount of 2 wt % to 16 wt %. More specifically, based on 100 wt % of said polymer component, the EVA copolymer has an amount of 31 wt % to 56 wt %, the first ethylene-α-olefin copolymer has an amount of 10 wt % to 20 wt %, the second ethylene-α-olefin copolymers has an amount of 20 wt % to 32 wt %, and PP has an amount of 2 wt % to 16 wt %.

The polymer component further includes a low-density polyethylene (LDPE). To be specific, the LDPE of the polymer component is linear low-density polyethylene (LLDPE). The LDPE of the polymer component has a MI ranging from 0.9 g/10 min to 5.5 g/10 min. Examples of commercially available LDPE are shown in Table 3.

TABLE 3

| Manufacturer | Type | MI (g/10 min) |
|---|---|---|
| USI Corporation | LL110 | 1 |
| | LL120 | 2 |
| | LL405 | 5.3 |
| Formosa Plastics Corporation | 3210 | 1 |
| | 3214 | 1 |
| ExxonMobil Chemical Company | LL 1001 | 1 |
| | LL 1002 | 2 |

More specifically, based on 100 wt % of the polymer component, the EVA copolymer has the amount of 31 wt % to 56 wt %, the first and second ethylene-α-olefin copolymers have the total amount of 28 wt % to 54 wt %, the PP has the amount of 2 wt % to 16 wt %, and the LDPE has an amount of 1 wt % to 21 wt %.

The plastic composition of the embodiment according to the disclosure may further include suitable additives. The additives may include a cross-linking agent(s), blowing agent(s), filler(s), blowing promoter(s), cross-linking aid(s), etc.

The cross-linking agent may include at least one of dicumyl peroxide (DCP), di(tert-butylperoxyisopropyl) benzene and a combination thereof. The amount of the cross-linking agent may be 0.35 to 0.65 parts by weight based on 100 parts by weight of the polymer component.

The blowing agent may be azodicarbonamide (AC), and the amount thereof may be 2 to 5 parts by weight based on 100 parts by weight of the polymer component.

The filler may include at least one of a talcum powder, calcium carbonate, and a combination thereof, and the amount thereof may be 0.5 to 6 parts by weight based on 100 parts by weight of the polymer component.

The blowing promoter may include at least one of zinc oxide (ZnO), stearic acid ($C_{18}H_{36}O_2$), zinc stearate ($C_{36}H_{70}O_4Zn$) and combinations thereof, and the amount thereof may be 1 to 3 parts by weight based on 100 parts by weight of the polymer component.

The cross-linking aid may include at least one of trimethylolpropane trimethacrylate (TMPTMA), triallyl cyanurate and a combination thereof, and the amount thereof may be 0.1 to 1 parts by weight based on 100 parts by weight of the polymer component.

EXAMPLES

Midsoles made from the plastic composition of the embodiment according to the disclosure can be provided with a resilience not lower than 55% measured according to ASTM D2632, and a shrinkage rate not greater than 1.5% measured according to SATRA TM-70. Properties of the midsoles are shown in Table 4.

TABLE 4

| Properties | TEST Methods | Unit | Test Values |
|---|---|---|---|
| Resilience | ASTM D2632 | % | ≥60 |
| Shrinkage rate (2.54 × 15 cm, 70° C., 40 min) | SATRA TM-70 | % | ≤1.3 |
| Hardness | ASTM D2240 | Shore C | 43~61 |
| Density | ASTM D297 | g/cm$^3$ | 0.15~0.22 |
| Tensile strength | ASTM D412 | kg/cm$^2$ | 28~37 |
| Elongation | ASTM D412 | % | 220~450 |
| Tear strength (type C) | ASTM D624 | kg/cm | 12~20 |
| Spilt tear strength | ASTM D3574 | kg/cm | 1~5 |
| Compression set | ASTM D395 | % | 18~50 |
| tanδ(−20° C.)/tanδ(40° C.) (10 Hz) | JIS K 7244-4 | — | 2.5~3.8 |

< Material List of Ingredients >

| Ingredients | Manufacturer | Type | General Names |
|---|---|---|---|
| EVA copolymer (VA = 28%) | E. I. du Pont de Nemours and Company | EVA265 | EVA |
| First ethylene-α-olefin copolymer | Mitsui Chemicals, Inc. | DF605 | DF605 |
| Second ethylene-α-olefin copolymer | Mitsui Chemicals, Inc. | DF810 | DF810 |
| PP | Formosa Plastics Corporation | PP1120 | PP |
| LDPE | USI Corporation | LL-120 | LDPE |
| Dicumyl peroxide | AkzoNobel Chemicals Co., Ltd. | BC-FF | DCP |
| Di(tert-butylperoxyisopropyl) benzene | AkzoNobel Chemicals Co., Ltd. | 14S-FL | BIBP |
| Azodicarbonamide | Polywinners Enterprise, Inc. | D600 | AC |

TABLE 4-continued

| | | | |
|---|---|---|---|
| Talcum powder | Etana Industrial Co., Ltd. | RB510 | Talc |
| Zinc oxide | Diamonchem International Co., Ltd. | ZnO-915 | ZnO |
| Stearic acid | Palm-Oleo Sdn. Bhd. | SA301/ B1800 | SA |
| Zinc stearate | Ming Ching Trading Co., Ltd. | Zn-ST | ZnST |
| Triallyl cyanurate | Sou Le Enterprise Co., Ltd. | TAC/GR70 | TAC |
| Trimethylolpropane trimethacrylate | Symtake Chemical Co., Ltd. | EM331 | TMPTMA |
| Calcium carbonate | Etana Industrial Co., Ltd. | HK-313 | CaCO3 |
| Isoprene rubber | Chuan Hseng Co., Ltd. | IR-2200 | IR |

Table 5 shows the properties of DF605 (first ethylene-α-olefin copolymer) and DF810 (second ethylene-α-olefin copolymer) that are shown in the Material List of Ingredients described hereinbefore.

TABLE 5

| Properties | Test Method | Unit | Test Values | |
|---|---|---|---|---|
| | | | DF605 | DF810 |
| MI (190° C.) | ASTM D1238 | G/10 min | 0.5 | 1.2 |
| Density | ASTM D1505 | kg/m³ | 862 | 885 |
| Tensile strength at break | JIS K 7113 | MPa | >5 | >27 |
| Tensile elongation at break | | % | 800 | 800 |
| Hardness | ASTM D2240 | Shore A | 58 | 87 |
| Torsional Stiffness 23° C. <-30° C. | ASTM D1043 | MPa MPa | 2 7 | 9 33 |
| Vicat softening point | ASTM D1525 | ° C. | — | 58 |
| Melting point | DSCMETHOD | ° C. | 50 | 66 |
| Brittle Temperature | ASTM D746 | ° C. | <-70 | <-70 |

Examples 1 to 8 and Comparative Examples 1 to 5

Examples 1 to 4 and Comparative Examples 1 to 3 were prepared by mixing the polymer components and the additives shown in Table 6. Examples 5 to 8 and Comparative Examples 4 to 5 were prepared by mixing the polymer components and the additives shown in Table 7.

The amount of EVA, DF605, DF810, PP, LDPE and IR shown in Table 6 and Table 7 are based on 100 wt % of the polymer component. The amount of the additives shown in Table 6 and Table 7 are based on 100 wt % of the polymer component.

TABLE 6

| | Ingredients | | Example | | | | Comparative Example | | |
|---|---|---|---|---|---|---|---|---|---|
| | | | 1 | 2 | 3 | 4 | 1 | 2 | 3 |
| | | | Amount (wt %) | | | | | | |
| Polymer component | EVA (28% VA) | | 50 | 50 | 50 | 50 | 100 | 20 | 50 |
| | DF605 | | 20 | 16 | 14 | 10 | — | 80 | — |
| | DF810 | | 25 | 23 | 22 | 20 | — | — | — |
| | PP | | 5 | 7 | 8 | 10 | — | — | — |
| | LDPE | | — | 4 | 6 | 10 | — | — | — |
| | IR | | — | — | — | — | — | — | 50 |
| Additive | Cross-linking agent | DCP | 0.4 | 0.45 | 0.45 | 0.5 | — | — | — |
| | | BIBP | — | — | — | — | 0.5 | 0.6 | 0.3 |
| | Blowing agent | AC | 3.4 | 3.5 | 3.6 | 3.8 | 2.9 | 3.7 | 4.2 |
| | Filler | Talc | 2 | — | — | 1 | — | — | — |
| | | CaCO₃ | — | — | — | — | 5 | 5 | 5 |
| | Blowing promoter | ZnO | 1 | — | — | 1 | 1 | 1 | 1 |
| | | SA | 0.3 | — | — | 0.3 | 1 | 1 | 1 |
| | | ZnST | 0.3 | — | — | 0.3 | 1 | 1 | 1 |
| | Cross-linking aid | TMPTMA | 0.5 | — | — | 0.5 | — | — | — |

TABLE 7

| | Ingredients | | Example | | | | Comparative Example | |
|---|---|---|---|---|---|---|---|---|
| | | | 5 | 6 | 7 | 8 | 4 | 5 |
| | | | Amount (wt %) | | | | | |
| Polymer component | EVA (28% VA) | | 50 | 44 | 41 | 35 | 20 | 30 |
| | DF605 | | 15 | 15 | 15 | 15 | 80 | — |
| | DF810 | | 32 | 27.2 | 24.8 | 20 | — | — |
| | PP | | 3 | 5.8 | 7.2 | 10 | — | — |
| | LDPE | | — | 8 | 12 | 20 | — | — |
| | IR | | — | — | — | — | — | 70 |
| Additive | Cross-linking agent | BIBP | 0.5 | 0.5 | 0.5 | 0.5 | 0.8 | 0.3 |
| | Blowing agent | AC | 2.9 | 3 | 3.1 | 3.25 | 2.8 | 3.2 |
| | Filler | Talc | 5 | — | — | 5 | 5 | 5 |
| | Blowing promoter | ZnO | 1 | — | — | 1 | 1 | 1 |
| | | SA | 0.5 | — | — | 0.5 | 1 | 1 |
| | | ZnST | 1 | — | — | 1 | 1 | 1 |
| | | TAC | 0.15 | — | — | 0.15 | — | — |

<Fabrication of Midsoles from Examples 1 to 8 and Comparative Examples 1 to 5>

Midsoles were made from the plastic compositions of Examples 1 to 4 and Comparative Examples 1 to 3 by employing the following Steps (1) to (7). Steps (3) to (7) are conducted using CMP techniques.

Step (1): The ingredients of each of Examples 1 to 4 and Comparative Examples 1 to 3 were mixed by using a kneader to form a mixture. The kneader was operated at a heavy hammer pressure of 4-4.5 kg/cm2 and a motor speed of 1200 rpm. The operating temperatures of the kneader are shown in Table 8.

TABLE 8

|  | Feed | First kneading | Second kneading | Third kneading | Discharge |
|---|---|---|---|---|---|
| Temperature(° C.) | 90 ± 10 | 100 ± 5 | 110 ± 5 | 120 ± 5 | 125 ± 5 |

Step (2): The mixture of each of Examples 1 to 8 and Comparative Examples 1 to 4 was granulated by a single screw granulation machine to form granules. The temperature of the die head of the single screw granulation machine was 90±5° C., and the temperature of the heater of the single screw granulation machine was 85±5° C.

Steps (3) to (7) were conducted through a CMP process mentioned as follows:

CMP Process

Step (3): The granules of each of Examples 1 to 4 and Comparative Examples 1 to 3 was first weighed according to the size of a primary forming mold used for initially foaming the granules into a foamed midsole blank. The granules were foamed in the primary forming mold that was pre-heated to 175±5° C. The foaming ratio and compression ratio used in foaming the granules are shown in Table 9. Thereafter, the foamed midsole blank was cooled to a room temperature for at least 12 hours and the size thereof was measured. During the foaming operation, a mold-closing pressure applied to the mold was 100±20 bar, and a vulcanization time was 420 to 600 seconds. The granules of Examples 1 to 4 were foamed in the same primary foaming mold (i.e. using the same foaming ratio).

TABLE 9

|  | Example | | | | Comparative Example | | |
|---|---|---|---|---|---|---|---|
|  | 1 | 2 | 3 | 4 | 1 | 2 | 3 |
| Foaming ratio (%) | | | | 175 | | | |
| Compression ratio (%) | | 175 | | | 175 | 165 | 160 |

Step (4): A bottom surface and a side surface of the foamed midsole blank molded from each of the Examples 1 to 4 and Comparative Examples 1 to 3 was roughened.

Step (5): The roughened midsole blank obtained from each of Examples 1 to 4 and Comparative Examples 1 to 3 was pressurized and heated in a secondary forming mold for a period of 420 to 600 seconds (the mold temperature was 155±5° C. and the mold-closing pressure was 120±20 kg/cm2).

Step (6): After thermal compression was carried out in Step (5), the secondary forming mold was directly cooled in a cold compression zone for 480-600 seconds to form a semi-product (the cooling temperature was 20° C. to 25° C. and the mold-closing pressure was 120±20 kg/cm2).

Step (7): After cold compression was carried out in Step 6, the cold compressed semi-product of each of Examples 1 to 4 and Comparative Examples 1 to 3 was trimmed at a room temperature to form a finished midsole. After the finished midsoles of the Examples were allowed to stay for at least one day, they are subjected to subsequent assembling procedures.

Midsoles were made from the plastic compositions of Examples 5 to 8 and Comparative Examples 4 to 5 by employing an IP process. Before the IP process was carried out, the plastic composition of each of Examples 5-8 and Comparative Examples 4-5 was formed into granules by employing the aforementioned Steps (1) and (2).

IP Process

Step (3'): The granules obtained from Steps (1) and (2) were first placed in an injection gun of an injection molding machine. The temperatures of four temperature zones of the injection gun were set to be 95° C. (gun nozzle), 93° C., 90° C. and 87° C. respectively. The granules were melted in the injection gun, and the resulting melt was injected into a forming mold (about a thickness of 10 mm) for foaming and forming into a foamed midsole at a foaming temperature of 175° C. for 300 seconds (for Examples 5-8)), or 420 seconds (for Comparative Examples 4-5). An injection pressure is 50 bar, and a feed pressure is 100 bar. The foaming ratio is shown in Table 10.

The midsoles made from Examples 5-8 were foamed in the same forming mold (i.e., using the same foaming ratio).

TABLE 10

|  | Example | | | | Comparative Example | |
|---|---|---|---|---|---|---|
|  | 5 | 6 | 7 | 8 | 4 | 5 |
| Foaming ratio (%) | | | | 160 | | |

Step (4'): The foamed midsoles obtained from Step (3') were allowed to pass through a plastic product conveyor oven for shape setting. The conveying time was about 20 min. The temperature used in shape setting was gradually reduced from 85° C., 85° C., to 55° C., 55° C., 35° C., and 35° C. sequentially.

Step (5'): The shape-set semi-products made from Examples 5 to 8 and Comparative Examples 4 to 5 were trimmed to form finished midsoles.

Alternatively, the midsoles made from Examples 1 to 4 may be fabricated using the IP process instead of the CMP process, and the midsoles made from Examples 5 to 8 may be fabricated using the CMP process instead of the IP process.

The midsoles of the Examples and Comparative Example were tested. The test results of the midsoles made from Examples 1 to 4 and Comparative Examples 1 to 3 are shown in Table 11. The test results of the midsoles made from Examples 5 to 8 and Comparative Examples 4 to 5 are shown in Table 12.

TABLE 11

| | Example | | | | Comparative Example | | |
|---|---|---|---|---|---|---|---|
| | 1 | 2 | 3 | 4 | 1 | 2 | 3 |
| Composition (wt %) | | | | | | | |
| EVA copolymer | 50 | 50 | 50 | 50 | 100 | 20 | 50 |
| DF605 | 20 | 16 | 14 | 10 | — | 80 | — |
| DF810 | 25 | 23 | 22 | 20 | — | — | — |
| PP | 5 | 7 | 8 | 10 | — | — | — |
| LDPE | — | 4 | 6 | 10 | — | — | — |
| IR | — | — | — | — | — | — | 50 |
| DF605/DF810 | 0.800 | 0.696 | 0.636 | 0.500 | — | — | — |
| Properties of the shoe midsole | | | | | | | |
| Resilience (%) | 69 | 67 | 65 | 64 | 67 | 73 | 65 |
| Shrinkage rate (%) | 1 | 0.5 | 0.5 | 0.5 | 3 | 2.5 | 3 |
| Hardness (Shore C) | 44~45 | 50~52 | 54~56 | 59~60 | 55~56 | 33~35 | 35~37 |
| Density(g/cm$^3$) | 0.1824 | 0.1908 | 0.1873 | 0.2165 | 0.2159 | 0.1869 | 0.1759 |
| Tensile strength (kg/cm$^2$) | 35.7 | 33.7 | 34.3 | 32.9 | 40.5 | 27.8 | 18.2 |
| Elongation (%) | 447.9 | 389.6 | 364.7 | 353.7 | 361.7 | 507.7 | 463.8 |
| Tear strength(kg/cm) | 14.61 | 16.87 | 18.87 | 17.90 | 19.34 | 9.5 | 6.7 |
| Split tear strength (kg/cm) | 2.46 | 2.32 | 3.21 | 3.73 | 3.55 | 2.01 | 1.01 |
| Permanent deformation remaining after release of a compression (%) | 31.14 | 24.74 | 19.88 | 24.17 | 45 | 45 | 38 |
| tanδ (−20° C.) | 0.2963 | 0.2667 | 0.2548 | 0.2306 | 0.2665 | 0.2266 | 0.2940 |
| tanδ (40° C.) | 0.0788 | 0.0981 | 0.1006 | 0.0904 | 0.0628 | 0.1255 | 0.1485 |
| tanδ (−20° C.)/ tanδ (40° C.) | 3.760 | 2.719 | 2.533 | 2.551 | 4.244 | 1.806 | 1.980 |

TABLE 12

| | Example | | | | Comparative Example | |
|---|---|---|---|---|---|---|
| | 5 | 6 | 7 | 8 | 4 | 5 |
| Composition (wt %) | | | | | | |
| EVA | 50 | 44 | 41 | 35 | 20 | 30 |
| DF605 | 15 | 15 | 15 | 15 | 80 | — |
| DF810 | 32 | 27.2 | 24.8 | 20 | — | — |
| PP | 3 | 5.8 | 7.2 | 10 | — | — |
| LDPE | — | 8 | 12 | 20 | — | — |
| IR | — | — | — | — | — | 70 |
| DF605/DF810 | 0.469 | 0.551 | 0.605 | 0.750 | — | — |
| Properties of the shoe midsole | | | | | | |
| Resilience (%) | 62 | 60~61 | 61 | 60 | 67 | 67 |
| Shrinkage rate (%) | 1.04 | 1.2 | 1 | 1.3 | 6.495 | 5.595 |
| Hardness (Shore C) | 45~46 | 51~52 | 54~55 | 59~60 | 35~36 | 28~29 |
| Density(g/cm$^3$) | 0.1887 | 0.193 | 0.184 | 0.182 | 0.1792 | 0.1792 |
| Tensile strength (kg/cm$^2$) | 29 | 30 | 30.5 | 31.1 | 22.9 | 20.7 |
| Elongation (%) | 315 | 297.3 | 253.4 | 229.8 | 563.1 | 446.4 |
| Tear strength(kg/cm) | 12.4 | 12.8 | 13 | 13 | 11.34 | 8.57 |
| Split tear strength (kg/cm) | 2.5 | 2.3 | 2.1 | 1.92 | 1.95 | 0.93 |
| Permanent deformation remaining after release of a compression (%) | 49.57 | 48.6 | 47.34 | 43.78 | 65.61 | 54.01 |

TABLE 12-continued

| | Example | | | | Comparative Example | |
|---|---|---|---|---|---|---|
| | 5 | 6 | 7 | 8 | 4 | 5 |
| tanδ (−20° C.) | 0.2754 | 0.3062 | 0.2773 | 0.2420 | 0.2371 | 0.3161 |
| tanδ (40° C.) | 0.0901 | 0.1159 | 0.0848 | 0.0835 | 0.1031 | 0.1612 |
| tanδ (−20° C.)/ tanδ (40° C.) | 3.057 | 2.642 | 3.270 | 2.898 | 2.300 | 1.961 |

The test results show that the midsoles made from Examples 1 to 8 have a resilience not lower than 55%, and a shrinkage rate not greater than 1.5%, and that the midsoles made from Comparative Examples 1 to 5 which are free of DF605 and DF810, or which only include DF605 have the shrinkage rate greater than 1.5% despite having resilience higher than 55%. The results prove that, when the midsoles are made from the plastic compositions of the disclosure, they may have a relatively high resilience (not lower than 55%) and a relatively low shrinkage rate (not higher than 1.5%), whereas, when the midsoles are made from the compositions that are free of the first and second ethylene-α-olefin copolymers, or free of the second ethylene-α-olefin copolymer, the shrinkage rates thereof cannot be lowered although the resilience values thereof are relatively high.

In addition, from the test results, it can be observed that the loss factor ratio of tan δ(−20° C.) to tan δ(40° C.) for the midsoles made from the plastic compositions of Examples 1 to 8 falls within a range of 2.5 to 3.8, whereas the loss factor ratio of tan δ(−20° C.) to tan δ(40° C.) for the midsoles made from the compositions of Comparative Examples 1 to 5 does not fall within the range of 2.5 to 3.8. This indicates that, when the midsoles made from the plastic composition of the disclosure have the loss factor ratio of tan δ(−20° C.) to tan δ(40° C.) falling within the range of from 2.5 to 3.8, the midsoles can have a relatively high resilience (not lower than 55%) and a relatively low shrinkage rate (not greater than 1.5%).

Furthermore, the plastic compositions of Examples 1-8 are foamed and formed in primary forming molds of identical size (or the same primary forming mold) so that they are foamed under the same foaming ratio, i.e., 160%, and the midsoles produced therefrom have different resilience values and shrinkage rates. This proves that, when different formulations of the plastic composition in the Examples are used to produce the midsoles having different hardness values, different resilience values and shrinkage rates, the different formulations can be foamed by using the same mold or primary molds of the same size (i.e., by using the same foaming ratio).

To sum up, by employing the first ethylene-α-olefin copolymer having a hardness ranging from 55 Shore A to 60 Shore A and the second ethylene-α-olefin copolymer having a hardness ranging from 85 Shore A to 90 Shore A, and by controlling the loss factor ratio of tan δ(−20° C.) to tan δ(40° C.) to fall within the range of 2.5 to 3.8, the resilience can be increased to a level not lower than 55% and the shrinkage rate can be lowered to a level not greater than 1.5%. In addition, the different formulations of the plastic composition of the disclosure can be foamed by using the same mold (i.e., using the same foaming ratio).

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A plastic composition for producing a plastic product, comprising:
    a polymer component including an ethylene-vinyl (EVA) copolymer, a first ethylene-α-olefin copolymer having a hardness ranging from 55 Shore A to 60 Shore A measured according to ASTM D2240, a second ethylene-α-olefin copolymer having a hardness ranging from 85 Shore A to 90 Shore A measured according to ASTM D2240, and polypropylene (PP),
    wherein the plastic product made from the composition has a loss factor ratio of tan δ(−20° C.) to tan δ(40° C.) at a frequency of 10 Hz, measured according to JIS k 7244-4, ranging from 2.5 to 3.8.

2. The plastic composition of claim 1, wherein a weight ratio of said first ethylene-α-olefin copolymer to said second ethylene-α-olefin copolymer ranges from 0.3 to 1.

3. The plastic composition of claim 2, wherein the weight ratio of said first ethylene-α-olefin copolymer to said second ethylene-α-olefin copolymer ranges from 0.4 to 0.8.

4. The plastic composition of claim 1, wherein said EVA copolymer has a melt flow index (MI) ranging from 0.9 to 9 g/10 min measured at a measurement temperature of 190° C. and under a load of 2.16 kg according to ASTM D 1238.

5. The plastic composition of claim 1, wherein at a measurement temperature of 190° C. under a load of 2.16 kg according to ASTM D 1238, said first ethylene-α-olefin copolymer has a melt flow index ranging from 0.4 g/10 min to 0.6 g/10 min, and said second ethylene-α-olefin copolymer has a melt flow index ranging from 1.1 g/10 min to 1.3 g/10 min.

6. The plastic composition of claim 1, wherein based on 100 wt % of said polymer component, said EVA copolymer has an amount of 31 wt % to 56 wt %, said first ethylene-α-olefin copolymer having an amount of 10 wt % to 20 wt %, said second ethylene-α-olefin copolymers having an amount of 20 wt % to 32 wt %, said PP having an amount of 2 wt % to 16 wt %.

7. The plastic composition of claim 1, wherein based on 100 wt % of said polymer component, said EVA copolymer has an amount of 31 wt % to 56 wt %, said first and second ethylene-α-olefin copolymers having a total amount of 28 wt % to 54 wt %, said PP having an amount of 2 wt % to 16 wt %.

8. The plastic composition of claim 1, wherein said polymer component further includes a low-density polyethylene (LDPE).

9. The plastic composition of claim 1, wherein based on 100 wt % of said polymer component, said EVA copolymer has an amount of 31 wt % to 56 wt %, said first and second ethylene-α-olefin copolymers having a total amount of 28 wt % to 54 wt %, said PP having an amount of 2 wt % to 16 wt %, said LDPE having an amount of 1 wt % to 21 wt %.

10. The plastic composition of claim 1, further comprising an additive, which is selected from the group consisting of a cross-linking agent, a blowing agent, a filler, a blowing promoter, a cross-linking aid, and combinations thereof.

11. The plastic composition of claim 10, wherein said cross-linking agent includes one of dicumyl peroxide (DCP), di(tert-butylperoxyisopropyl) benzene and a combination thereof, and has an amount of 0.35 to 0.65 parts by weight based on 100 parts by weight of the polymer component.

12. The plastic composition of claim 10, wherein said blowing agent includes azodicarbonamide (AC), and has an amount of 2 to 5 parts by weight based on 100 parts by weight of the polymer component.

13. The plastic composition of claim 10, wherein said blowing promoter includes one of zinc oxide (ZnO), stearic acid ($C_{18}H_{36}O_2$), zinc stearate ($C_{36}H_{70}O_4Zn$) and combinations thereof, and has an amount of 1 to 3 parts by weight based on 100 parts by weight of the polymer component.

14. The plastic composition of claim 10, wherein said cross-linking aid includes one of trimethylolpropane trimethacrylate (TMPTMA), triallyl cyanurate and a combination thereof, and has an amount of 0.1 to 1 parts by weight based on 100 parts by weight of the polymer component.

15. A midsole made from a plastic composition, the plastic composition comprising a polymer component that includes an ethylene-vinyl acetate (EVA) copolymer, a first ethylene-α-olefin copolymer having a hardness ranging from 55 Shore A to 60 Shore A measured according to ASTM D2240, a second ethylene-α-olefin copolymer having a hardness ranging from 85 Shore A to 90 Shore A measured according to ASTM D2240, and polypropylene (PP), wherein the midsole has a loss factor ratio of tan δ(−20° C.) to tan δ(40° C.) at a frequency of 10 Hz, measured according to JIS K 7244-4, ranging from 2.5 to 3.8, a resilience not lower than 55% measured according to ASTM D2632, and a shrinkage rate not greater than 1.5% measured according to SATRA TM-70.

16. A method for producing midsoles, comprising:
providing a plastic composition as claimed in claim 1;
preparing different formulations from the plastic composition;
foaming each of the formulations in a primary forming mold to form a foamed midsole blank; and
forming the foamed midsole blank in a secondary forming mold to produce a final midsole;
wherein the different formulations are foamed by using the same primary forming mold that provides the same foaming ratio, and the final midsoles produced from the different formulations of the plastic composition have different resilience and shrinkage properties.

* * * * *